United States Patent [19]

Lerner

[11] Patent Number: 5,207,928
[45] Date of Patent: May 4, 1993

[54] METHOD FOR DESALINATION AND FRESH WATER RECOVERY

[76] Inventor: Eric J. Lerner, 20 Pine Knoll Dr., Lawrenceville, N.J. 08648

[21] Appl. No.: 704,886

[22] Filed: May 23, 1991

[51] Int. Cl.$^5$ .............................................. B01D 1/16
[52] U.S. Cl. .................................. 210/774; 159/48.1; 203/90; 203/DIG. 17; 210/808
[58] Field of Search ............... 210/702, 808, 737, 774; 159/48.1; 203/10, 11, 90, DIG. 17; 202/185.2

[56] References Cited

U.S. PATENT DOCUMENTS

| | | | |
|---|---|---|---|
| 3,871,180 | 3/1975 | Swanson | 203/90 |
| 3,948,734 | 4/1976 | Kohl et al. | 202/185.2 |
| 4,159,227 | 6/1979 | Sundquist | 202/185.2 |
| 4,292,121 | 9/1981 | Caffes | 159/48.1 |
| 4,323,424 | 4/1982 | Secunda et al. | 159/48.1 |

Primary Examiner—Mary Lynn Theisen
Assistant Examiner—Sun Uk Kim

[57] ABSTRACT

A method of saltwater desalination and fresh water recovery comprises spraying a mixture of saltwater droplets substantially in the range of 7 to 30 microns in diameter and compressed air with a mass flow ratio of about one part compressed air to 10 parts saltwater droplets, without heating the droplets, into a chamber at a velocity of at least 200 meters per second to progressively vaporize the saltwater droplets for effectuating precipitation of dissolved impurities and salts from the vaporizing saltwater droplets and accumulation of a fresh water droplet suspension within the chamber and evacuating the accumulated fresh water droplet suspension out of the chamber at a rate controlled by a blower to maintain the fresh water droplets in suspension and washing fresh water droplets from the evacuated freshwater droplets suspension and collecting the fresh water.

4 Claims, 1 Drawing Sheet

METHOD FOR DESALINATION AND FRESH WATER RECOVERY

BACKGROUND OF THE INVENTION

The present invention relates to desalination, and more particularly to a method of and apparatus for destination and fresh water recovery which does not require high temperature vaporization.

Conventional desalination techniques include vaporization of saltwater by heating, and subsequent condensation of the water vapor. These processes have very high thermal energy requirements; typically more than 2,000 joules per gram of water are required to vaporize the water. Therefore, in order to be economical, conventional desalination processes require that as much heat as possible be recovered during condensation of the water vapor. Complete heat recovery is impossible and even the best designed long vertical tube evaporators and flash distillation units require at least 30 joules per gram of water. This is far above a theoretical minimum value of less than two joules per gram of water for removing salt out of solution.

I order to eliminate the heat loss caused by imperfect heat recovery during the condensation stage of the conventional desalination techniques, it would be necessary to vaporize the saltwater without heating it. U.S. Pat. No. 4,323,424 issued Apr. 6, 1982 to Secunda et al. discloses a method and apparatus for generating a stream of high velocity saltwater droplets that vaporize without being heated. Salt precipitates from the vaporizing saltwater droplets, and the resultant water vapor can be recovered as fresh water.

According to the method disclosed in the patent, saltwater is atomized to create small saltwater droplets, no larger than six microns, that evaporate in relatively dry ambient air under standard conditions. Thus, the mechanism for evaporation is diffusion. Evaporation is complete and dry salt particles of the order of one micron are recovered. The water vapor is subsequently collected as fresh water.

One technique for atomizing the saltwater disclosed in the patent is the use of an atomization nozzle through which air and water flow under high pressure. The patent teaches an air to water mass flow ratio of about 17:1 and about 0:1. The high mass of air relative to the mass of water flowing through the atomizing nozzle limits the mass flow rate of the water and thus the volume of fresh water that can be collected.

Additionally, the patent disclosure is directed toward the recovery of the dissolved salt or other solute, and teaches the recovery of fresh water simply by placing a collection screen in the flow path of the water droplets There is no structure or technique disclosed for maximizing the amount of fresh water recovered.

SUMMARY OF THE INVENTION

An object of the invention is to provide a method of and apparatus for desalination and fresh water recovery which does not require heat vaporization of saltwater.

Another object of the invention is to provide a method of and apparatus for desalination and fresh water recovery which does not require cooling of water vapor in order to generate useable quantities of fresh water.

Another object of the present invention is to provide a method of and apparatus for desalination and fresh water recovery having a low total energy and capital requirement.

According to the invention, saltwater is atomized and small saltwater droplets are injected into a closed space mixed with compressed air moving at sufficiently high velocity to cause the saltwater droplets to vaporize. The water vapor thus generated instantaneously condenses to form a suspension of fresh water droplets. The process continues until the atmosphere within the space is near saturation, or actually becomes supersaturated, with a suspension of fresh water droplets. The water droplet suspension is then evacuated from the space and precipitated to recover the fresh water.

The fresh water droplet suspension is evacuated by generating a flow of air through the space for transporting the fresh water droplet suspension out of the space at a controlled rate to maintain the fresh water droplets in suspension. The fresh water droplets are transported through a recovery path in which precipitation of the fresh water is carried out.

Precipitation is carried out by flowing the fresh water droplet suspension through the recovery path, and spraying fresh water in large droplets into the recovery path to provide nucleation sites for the smaller fresh water droplets. The precipitated fresh water is then collected.

The process described by U.S. Pat. No. 4,323,424 has limitations when used for the desalination of sea water, a principal application of the present invention. The use of large masses of compressed air for each mass of water requires the consumption of energy in amounts greater than that needed for conventional (multi-stage flash distillation) desalination processes. In addition, the movement of the water in the form of water vapor mixed with much larger masses of air requires very large apparatus with high capital costs. Finally the necessity for condensing the water by cooling the air-water vapor mixture adds other capital and energy requirements.

My process avoids these problems by atomizing water using only small amounts of compressed air, about one mass of air for every 10 masses of water, thus greatly reducing the energy required. In addition, by deliberately not supplying sufficient air for the water to remain in the vapor phase, I ensure that the fresh water is transported in the form of a liquid water mist. Such a mist is much more compact than a water-vapor-air mixture, allowing the use of much smaller apparatus at much reduced capital cost. Finally, since the water is already in liquid phase, condensation by cooling a water-vapor air mixture is not required. Any suitable recovery means for the mist may be used, such as washing the water mist out of the air with a large droplet fresh water spray.

DETAILED DESCRIPTION OF THE INVENTION

Figure 1:
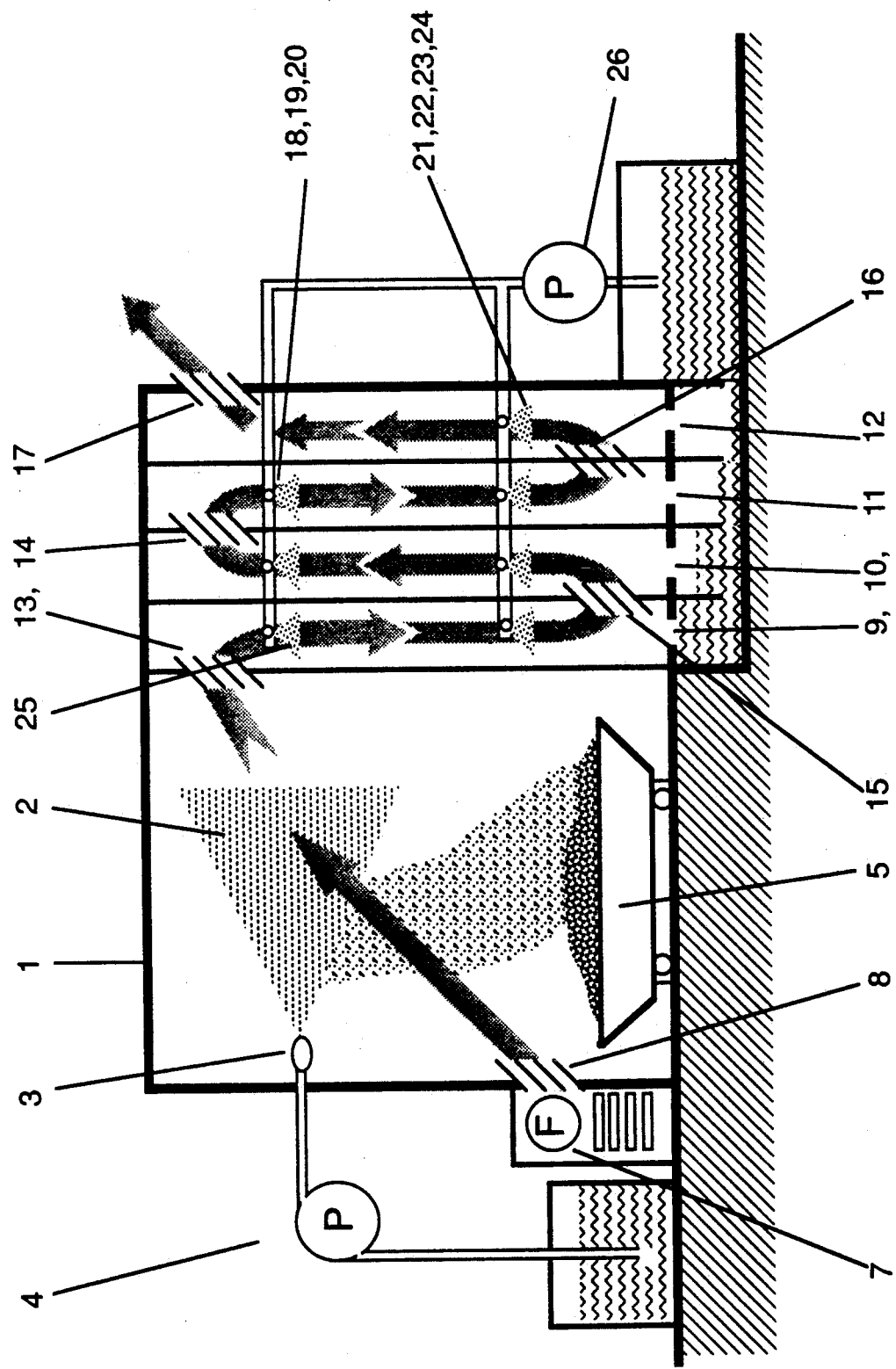
FIG. 1 is a sectional elevation view of the apparatus according to the invention.

An apparatus according to the invention is illustrated in FIG. 1 and includes a chamber 1 which receives a spray 2 of saltwater and compressed air injected into the chamber by a nozzle 3. The nozzle 3 has an orifice which opens into the chamber 1, and saltwater and compressed air mixture is pumped through the nozzle 3 by a pump 4 giving the compressed air a velocity sufficiently high so that saltwater droplets of the spray 2 progressively vaporize within the chamber 1. As the saltwater droplets vaporize dissolved impurities and salts in the seawater precipitate out of the vaporizing seawater droplets and are received by a collector 5 at the bottom of the chamber. The collector 5 is removable for collecting accumulated precipitate.

The water vapor remaining within the chamber 1 will condense to form suspended droplets of pure or fresh water. A resultant fresh water droplet suspension will accumulate above the saltwater spray 2 and is removed from the chamber A blower 7 develops an air flow in the chamber 1 for evacuating the accumulated fresh water droplet suspension from the chamber 1, and the blower can be operated continuously or intermittently as required. Operation of the blower creates a flow of air within the chamber 1 in a direction indicated by arrows. This flow of air is sufficient to carry with it the accumulated fresh water droplets but is not so strong as to carry the precipitate. The flow of air through the chamber 1 can be controlled by operation of the blower 7 and by dampers 8 between the blower 8 and the interior of chamber 1.

The chamber 1 is in communication with a series of vertical ducts 9-12 which are in communication and define a flow path for the fresh water droplet suspension evacuated from the chamber 1. The series of ducts 9-12 include an intake backdraft damper 13 for controlling the flow into the first duct 9, a plurality of backdraft dampers 14-16 for controlling flow between successive ducts, and an exhaust backdraft damper 17 for controlling flow out of the last duct 12. A plurality of nozzles 18-24 are disposed within the ducts 9-12. The nozzles 18-24 spray fresh water into the ducts, and the fresh water sprays from the nozzles are respectively represented by lines as those identified by reference numeral 25 for nozzle 18. The nozzles 18-24 are selected and positioned to provide a distribution of fresh water droplet sizes which are effective to provide nucleation sites within the fresh water droplet suspension evacuated from the chamber 1 and transported through the ducts 9-12 by the flow of air. The suspended fresh water droplets will nucleate on the fresh water droplets sprayed by the nozzles 18-24 and will precipitate within the ducts 9-12 and accumulate at the bottom thereof. The accumulated fresh water at the bottom of the ducts 9-12 can be recovered and stored in any convenient manner. A pump 26 is provided for removing stored fresh water and pumping it back to nozzles 18-24 to maintain the fresh water spray within the ducts.

The apparatus according to the invention is operated in the following manner.

Saltwater is continually sprayed into the chamber 1 in order to accumulate a suspension of fresh water droplets.

The following is believed to be a description of the physical mechanism by which the suspension of fresh water droplets is created.

The air exits the nozzle at high velocity, approaching sonic speed. The water, however, having high mass relative to the air is not instantly accelerated to the same velocities. The air therefore maintains a high velocity relative to the droplets of salt water exiting the nozzle. As a result of this high relative air velocity, microscopic zones of low pressure are formed in the wake of each droplet or group of droplets. At sufficiently high relative velocities, these zones have pressure sufficiently low to allow the salt water droplets to evaporate, even if the air within the chamber is saturated while at ambient pressure. The droplets then evaporate, leaving behind salt particles that precipitate. As the vapor leaves the microscopic regions of low pressure, it joins the saturated air and instantly condenses as fresh water droplets.

When the concentration of fresh water droplets within the chamber 1 is sufficient to initiate precipitation, or somewhat before that concentration, the blower 8 is operated to develop the flow of air that evacuates the fresh water droplet suspension from the chamber 1 and flows it through the series of ducts 9–12 where the fresh water droplet suspension interacts with the fresh water spray and precipitates. After the fresh water droplet suspension has been evacuated from the chamber 1 the blower 8 is turned off and accumulation of a fresh water droplet suspension within the chamber begins again.

For a 216 cubic foot chamber, it should be possible to accumulate a fresh water droplet suspension having a concentration of 1–2% of the volume of chamber 1 before evacuation of the chamber is required. To effectuate rapid evacuation of the fresh water droplet suspension from chamber 1 the saltwater spray may be terminated in order to allow use of a fast air flow for evacuating the chamber.

The nozzle 3 may have an orifice diameter between about 0.020 and 0.120 inches for developing saltwater droplets having diameters of the order of 1 to 30 microns. Alternatively, a plurality of nozzles 3 may be used together. For a cluster of twenty five nozzles the pump 4 should have a constant speed flow rate of the order of 9.5 liters/min (2.5 gal/min) at an operating pressure of the order of 5 kg/sq.cm. (75 psi) with each nozzle flowing about 0.39 liters/min (0.1 gal/min) at 5 kg/sq.cm. (75 psi). The compressed air sprayed by the nozzle 3 must have a minimum velocity of the order of 200 meters/sec in order to vaporize. To enhance formation of small saltwater droplets compressed air is injected into the flow of saltwater to the nozzle 3 in amounts such that the air to water mass flow ratio is about 1:10.

The chamber 1 and the walls of the ducts 9–12 are made of plexiglass. The chamber 1 is a cube six feet (1.8 meters) on a side and the ducts measure one foot by six feet by six feet. The blower 8 has a flow rate of the order of 1.4 to 2.8 cubic meters/min (50 to 100 cubic feet/min) at a pressure of one atmosphere.

I claim:

1. A method of saltwater desalination and fresh water recovery, comprising:

spraying a mixture of saltwater droplets substantially in the range of 7 to 30 microns in diameter and compressed air with a mass flow ratio of about one part compressed air to 10 parts saltwater droplets, without heating the droplets, into a chamber at a velocity of at least 200 meters per second to progressively vaporize the saltwater droplets for effectuating precipitation of dissolved impurities and salts from the vaporizing saltwater droplets and accumulation of a fresh water droplet suspension within the chamber;

evacuating the accumulated fresh water drop suspension out of the chamber at a rate controlled by a blower to maintain the fresh water droplets in suspension;

washing fresh water droplets from the evacuated fresh water droplets suspension; and collecting the fresh water.

2. A method according to claim 1, wherein the step of spraying a mixture of saltwater droplets and compressed air comprises flowing saltwater and compressed air through a nozzle at a velocity of at least 200 meters per second to develop a spray of progressively vaporizing saltwater droplets.

3. A method according to claim 1, wherein the step of evacuating the accumulated fresh water droplet suspension comprises:

generating a flow of air through the chamber for transporting the accumulated fresh water droplet suspension out of the chamber; and flowing the fresh water droplet suspension through a series of ducts at a controlled flow rate.

4. A method according to claim 1, wherein the step of spraying a mixture of saltwater droplets and compressed air into the chamber and the step of evacuating the accumulated fresh water droplet suspension from the chamber are carried out simultaneously to permit simultaneous desalination of saltwater within the chamber and precipitation of freshwater outside of the chamber.

* * * * *